United States Patent
Chan et al.

(10) Patent No.: US 11,539,756 B2
(45) Date of Patent: Dec. 27, 2022

(54) SWITCH DEVICE FOR ONE-WAY TRANSMISSION

(71) Applicant: BlackBear (Taiwan) Industrial Networking Security Ltd., Hsinchu (TW)

(72) Inventors: Yuan Chen Chan, Hsinchu (TW); Po-Chih Hsu, Changhua County (TW)

(73) Assignee: BlackBear (Taiwan) Industrial Networking Security Ltd., Hsinchu (TW)

(*) Notice: Subject to any disclaimer, the term of this patent is extended or adjusted under 35 U.S.C. 154(b) by 130 days.

(21) Appl. No.: 17/149,633

(22) Filed: Jan. 14, 2021

(65) Prior Publication Data

US 2022/0131736 A1    Apr. 28, 2022

Related U.S. Application Data

(60) Provisional application No. 63/104,522, filed on Oct. 23, 2020.

(51) Int. Cl.
| | | |
|---|---|---|
| *H04L 12/66* | (2006.01) | |
| *H04L 65/10* | (2022.01) | |
| *H04B 10/114* | (2013.01) | |
| *H04L 45/24* | (2022.01) | |
| *H04L 9/40* | (2022.01) | |

(52) U.S. Cl.
CPC ...... *H04L 65/1013* (2013.01); *H04B 10/1141* (2013.01); *H04L 45/24* (2013.01); *H04L 63/0209* (2013.01)

(58) Field of Classification Search
CPC ............... H04B 10/1141; G06F 21/606; G06F 21/6236; G06F 21/85; G06F 2211/009; G06F 2221/2113; H03K 17/005; H04L 45/24; H04L 63/0209; H04L 63/105; H04L 65/1013
See application file for complete search history.

(56) References Cited

U.S. PATENT DOCUMENTS

| | | | |
|---|---|---|---|
| 5,703,562 A | 12/1997 | Nilsen | |
| 6,108,787 A * | 8/2000 | Anderson | ........... G06F 21/6236 726/5 |
| 7,305,549 B2 | 12/2007 | Hunt et al. | |
| 7,649,452 B2 | 1/2010 | Zilberstein et al. | |

(Continued)

FOREIGN PATENT DOCUMENTS

| | | |
|---|---|---|
| CN | 110943720 | 3/2020 |
| EP | 1052776 | 11/2000 |
| TW | 201840164 | 11/2018 |

OTHER PUBLICATIONS

"Office Action of Taiwan Counterpart Application", dated Oct. 19, 2021, p. 1-p. 7.

(Continued)

*Primary Examiner* — Frank Duong
(74) *Attorney, Agent, or Firm* — JCIPRNET

(57) ABSTRACT

A switch device is provided. The switch device includes a switch and a one-way link circuit, wherein the switch including a first port, a second port, and a third port. The third port coupled to the second port via a first path and coupled to the first port via a second path. An input terminal of the one-way link circuit is coupled to the first port.

12 Claims, 3 Drawing Sheets

(56) References Cited

U.S. PATENT DOCUMENTS

| | | | |
|---|---|---|---|
| 7,675,867 B1 * | 3/2010 | Mraz | H04L 63/123 370/254 |
| 8,050,260 B1 | 11/2011 | Dropps et al. | |
| 8,068,504 B2 * | 11/2011 | Brindle | H04L 63/0209 709/225 |
| 8,139,581 B1 | 3/2012 | Mraz et al. | |
| 8,250,235 B2 | 8/2012 | Harvey et al. | |
| 8,250,358 B2 | 8/2012 | Cheng | |
| 8,352,450 B1 | 1/2013 | Mraz et al. | |
| 8,353,022 B1 | 1/2013 | Menoher et al. | |
| 8,732,453 B2 | 5/2014 | Mraz et al. | |
| 8,776,254 B1 | 7/2014 | Mraz et al. | |
| 8,891,546 B1 | 11/2014 | Frenkel et al. | |
| 8,893,253 B2 | 11/2014 | Cianfrocca | |
| 9,088,539 B2 | 7/2015 | Mraz | |
| 9,088,558 B2 | 7/2015 | Curry et al. | |
| 9,219,685 B2 | 12/2015 | Lu et al. | |
| 9,306,953 B2 | 4/2016 | Mraz et al. | |
| 9,521,120 B2 | 12/2016 | Ferry | |
| 9,736,121 B2 | 8/2017 | Mraz et al. | |
| 9,749,011 B2 | 8/2017 | Kim et al. | |
| 9,762,536 B2 | 9/2017 | Frenkel et al. | |
| 9,847,972 B2 | 12/2017 | Frenkel et al. | |
| 10,075,415 B2 | 9/2018 | Cianfrocca | |
| 10,218,715 B2 | 2/2019 | Thomson et al. | |
| 10,438,024 B2 * | 10/2019 | Takahashi | G06F 21/83 |
| 10,476,844 B2 | 11/2019 | Cianfrocca | |
| 10,764,117 B1 | 9/2020 | Lin et al. | |
| 2013/0010954 A1 | 1/2013 | Falk et al. | |
| 2016/0330203 A1 | 11/2016 | Frenkel | |
| 2017/0353368 A1 | 12/2017 | Blocher et al. | |
| 2020/0053048 A1 | 2/2020 | Frenkel | |
| 2020/0120071 A1 | 4/2020 | Wimmer et al. | |
| 2020/0259585 A1 | 8/2020 | Aust et al. | |
| 2021/0266290 A1 * | 8/2021 | Batouq | H04L 67/565 |

OTHER PUBLICATIONS

"Search Report of Europe Counterpart Application", dated Nov. 8, 2021, p. 1-p. 7.

* cited by examiner

SWITCH DEVICE FOR ONE-WAY TRANSMISSION

CROSS-REFERENCE TO RELATED APPLICATION

This application claims the priority benefit of U.S. provisional application Ser. No. 63/104,522, filed on Oct. 23, 2020. The entirety of the above-mentioned patent application is hereby incorporated by reference herein and made a part of this specification.

BACKGROUND

Technical Field

The disclosure is directed to a switch device for one-way transmission.

Description of Related Art

In order to prevent a secure site (or OT: Operation Technology site) from being attacked by computer virus or hackers from Internet, a one-way transmission technique is normally used for performing a data transmission between the secure site and an unsecure site (or IT: Information Technology site). A one-way link may limit the direction of signals such that the signals can only be transmitted from the secure site to the unsecure site, and no signals can be transmitted from the unsecure site to the secure site. A one-way link can be implemented by connecting devices (or computers) in the secure site to a sending node (e.g., a proxy server) and connecting devices (or computers) in the unsecure site to a receiving node (e.g., a proxy server), wherein the sending node may convert signals of bi-directional protocol to signals of unidirectional protocol, and the receiving node may convert the signals of unidirectional protocol to the original signals that can be recognized by the devices in the unsecure site.

Since the sending node is the only device connected to the input terminal of the one-way link, the sending node can be the bottleneck of the one-way link. If there are multiple signals with different protocols needed to be transmitted by the sending node, the sending node will have to be capable of providing a large amount of computing resources.

On the other hand, a device for performing a regular diagnosis or firmware upgrade procedure for a device in the secure site may bring virus to the device. Therefore, how to prevent devices in the secure site from infecting each other is an important issue to the art.

SUMMARY

Accordingly, the present disclosure is directed to a switch device for one-way transmission, wherein the present disclosure may guarantee the protection of the secure site and may resolve bottleneck issues of one-way transmission.

The present invention is directed to a switch device for one-way transmission. The switch device includes a switch and a one-way link circuit, wherein the switch including a first port, a second port, and a third port. The second port is coupled to the third port via a first path and coupled to the first port via a second path. An input terminal of the one-way link circuit is coupled to the first port.

In an exemplary embodiment of the present invention, the one-way link circuit is implemented by at least one of the followings: a diode circuit, a fiber, a RJ45 connector, and a field programmable gate array.

In an exemplary embodiment of the present invention, the switch further including: a fourth port coupled to the first port via a third path.

In an exemplary embodiment of the present invention, the switch further including: a fourth port coupled to the third port via a third path; and a second one-way link circuit, wherein a second input terminal of the second one-way link circuit is coupled to the fourth port.

In an exemplary embodiment of the present invention, the switch further including: a fourth port and a fifth port, wherein the fifth port is coupled to the fourth port via a third path and coupled to the first port via a fourth path.

In an exemplary embodiment of the present invention, the switch device further including: an electronic device coupled to the second port; and a gateway coupled to the third port, wherein the electronic device transmits a first signal supported a first protocol to the gateway via the second port and the third port, wherein the gateway converts the first signal to a second signal supported a second protocol and outputs the second signal via the one-way link circuit.

In an exemplary embodiment of the present invention, the second protocol is a unidirectional protocol.

In an exemplary embodiment of the present invention, the switch device further including: an electronic device coupled to the fourth port, wherein the electronic device outputs a signal supported a first protocol via the fourth port, the first port, and the one-way link circuit.

In an exemplary embodiment of the present invention, the first protocol is a unidirectional protocol.

In an exemplary embodiment of the present invention, the third port coupled to the fourth port via a fifth path.

In an exemplary embodiment of the present invention, the switch device further including: a first electronic device coupled to the fourth port; a first gateway coupled to the fifth port; and a second gateway coupled to the third port and the first gateway, wherein the electronic device transmits a first signal supported a first protocol to the first gateway via the fourth port and the fifth port, and transmits the first signal to the second gateway via the fourth port and the third port, wherein in response to the first gateway not being failed, the first gateway converts the first signal to a second signal supported a second protocol and outputs the second signal via the one-way link circuit.

In an exemplary embodiment of the present invention, in response to the first gateway being failed, the second gateway converts the first signal to a second signal supported a second protocol and outputs the second signal via the one-way link circuit.

In an exemplary embodiment of the present invention, the second protocol is a unidirectional protocol.

In view of the foregoing, the present disclosure may create isolated subnets for devices in the secure site to reduce security issue, and the present disclosure may connect multiple computing devices to the input terminal of the one-way link to resolve bottleneck issues.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
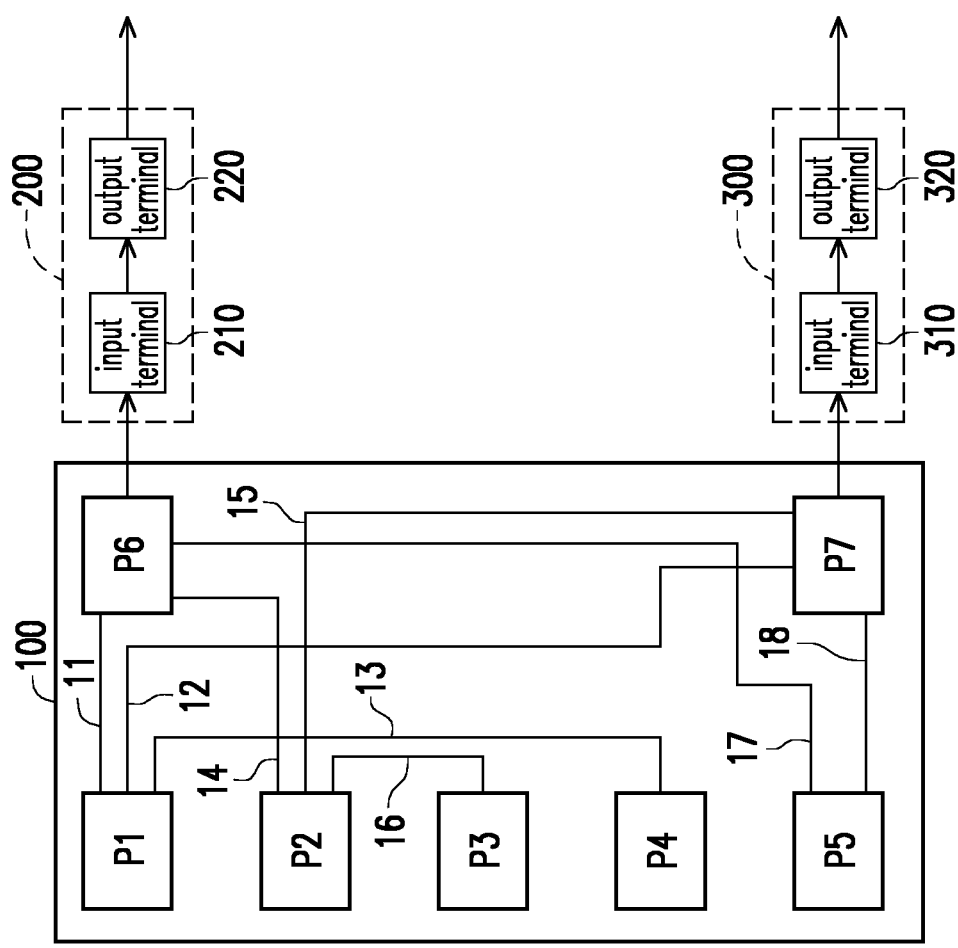
FIG. 1 illustrates a schematic diagram of a switch device for one-way transmission according to an embodiment of the disclosure.

In order to make the disclosure more comprehensible, several embodiments are described below as examples of implementation of the disclosure. Moreover, elements/components/steps with the same reference numerals are used to represent identical or similar parts in the figures and embodiments where appropriate.

FIG. 1 illustrates a schematic diagram of a switch device 10 for one-way transmission according to an embodiment of the disclosure. The switch device 10 may include a switch 100. In one embodiment, the switch device 10 may further include a one-way link circuit 200 and/or a one-way link circuit 300.

The switch 100 may have a plurality of source ports including, for example, port P1, port P2, port P3, port P4, and/or port P5. On the other hand, the switch 100 may have one or more destination ports including, for example, port P6 and/or port P7.

The port P1 may be coupled to the port P4 via path 13, may be coupled to the port P6 via path 11, and may be coupled to the port P7 via path 12. The port P2 may be coupled to the port P6 via path 14, may be coupled to the port P7 via path 15, and may be coupled to the port P3 via path 16. The port P5 may be coupled to the port P6 via path 17 and may be coupled to the port P7 via path 18.

The one-way link circuit 200 may include an input terminal 210 and an output terminal 220. The one-way link circuit 200 may receive data packets through the input terminal 210 and may transmit the received data packets through the output terminal 220. The data packets only can be transmitted in the direction from the input terminal 210 to the output terminal 220, and cannot be transmitted in the direction from the output terminal 220 to the input terminal 210. The input terminal 210 of the one-way link circuit 200 may connect to the port P6 of the switch 100 to receive data packets from the port P6.

Similar to the one-way link circuit 200, the one-way link circuit 300 may include an input terminal 310 and an output terminal 320. The one-way link circuit 300 may receive data packets through the input terminal 310 and may transmit the received data packets through the output terminal 320. The data packets only can be transmitted in the direction from the input terminal 310 to the output terminal 320, and cannot be transmitted in the direction from the output terminal 320 to the input terminal 310. The input terminal 310 of the one-way link circuit 300 may connect to the port P7 of the switch 100 to receive data packets from the port P7.

In one embodiment, the one-way link circuit 200 or the one-way link circuit 300 may be implemented by at least one of the followings: a diode circuit, a fiber, a RJ45 connector, and a field programmable gate array (FPGA), but the disclosure is not limited thereto.

In one embodiment, the paths between each port of the switch device 10 (or the routine rule of the switch device 10) may be configured by a switch configuration including an egress rule, wherein the switch configuration may be transmitted to the switch device 10 via a set of commands.

Figure 2:
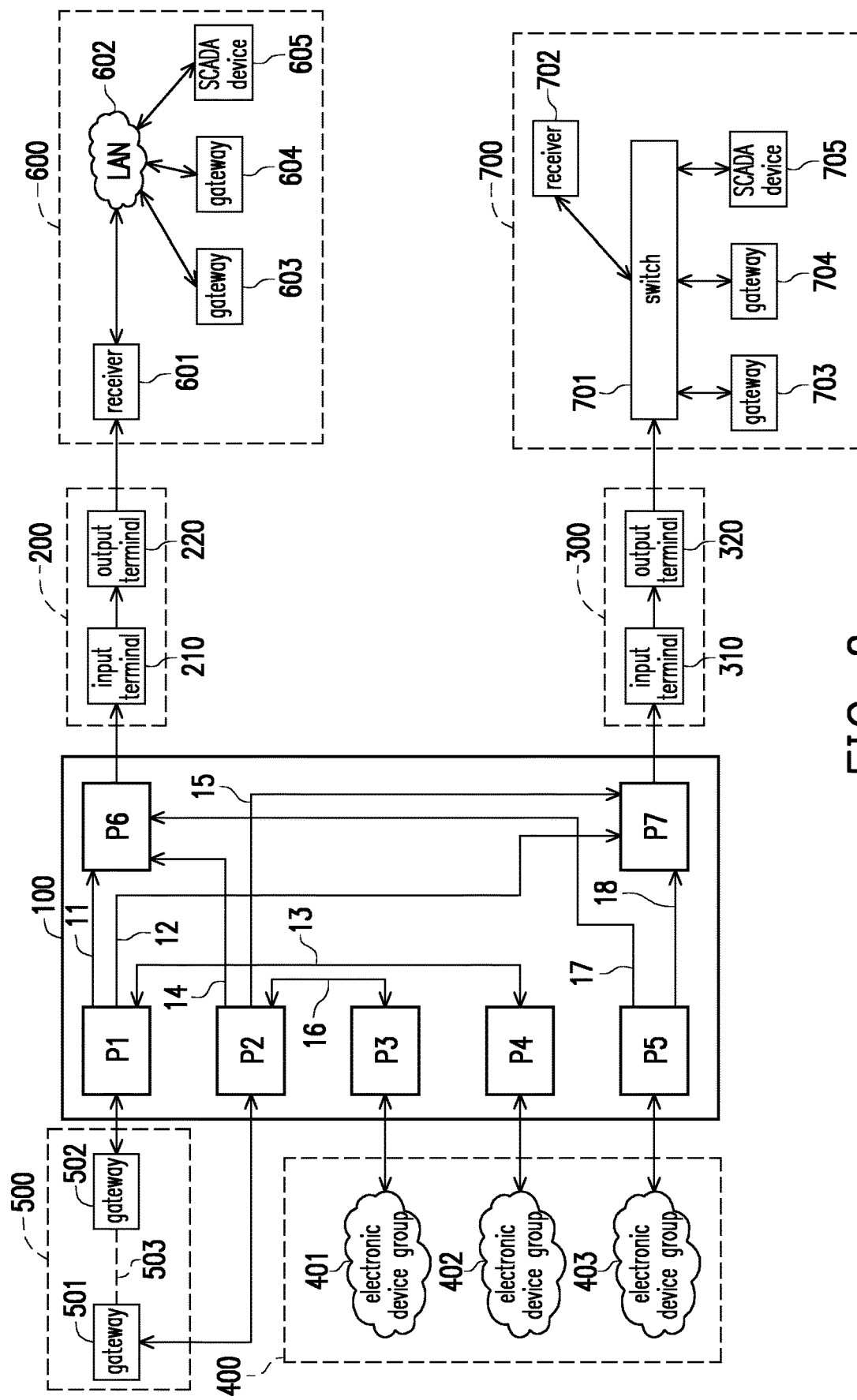
FIG. 2 illustrates connecting a secure site to an unsecure site by the switch device according to an embodiment of the disclosure.

FIG. 2 illustrates connecting a secure site to an unsecure site by the switch device according to an embodiment of the disclosure. In the embodiment, the switch device 10 may further include a plurality of electronic device groups such as an electronic device group 401, an electronic device group 402, or an electronic device group 403 set up in a secure site 400, wherein each of the electronic device group may include, for example, a sensor or a computing device, but the disclosure is not limited thereto. The electronic device group 401, electronic device group 402, and electronic device group 403 may support the same of different communication protocols such as bi-directional protocols or unidirectional protocols, wherein the bi-directional protocols may include transmission control protocol (TCP), and the unidirectional protocols may include user datagram protocol (UDP) such as a real time transport protocol (RTP), a simple network management protocol (SNMP), a routing information protocol (RIP), or a domain name server (DNS) lookup. For example, the electronic device group 401 and the electronic device group 402 may support TCP based protocols, and the electronic device group 403 may support UDP based protocols.

In the embodiment, the switch device 10 may further include a plurality of electronic devices such as a gateway (or proxy server) 501 or a gateway 502 set up in a secure site 500. The gateway 501 and the gateway 502 may support the same of different communication protocols such as bi-directional protocols or unidirectional protocols, wherein the bi-directional protocols may include TCP, and the unidirectional protocols may include UDP such as RTP, SNMP, RIP, or DNS lookup. For example, the gateway 501 or the gateway 502 may receive data packets of bi-directional protocol from the secure site 400 and may convert the received data packets to data packets of unidirectional protocol so as to transmit the data packets of unidirectional protocol to the unsecure site 600 or the unsecure site 700.

In the embodiment, an unsecure site 600 may include a plurality of electronic devices such as a receiver 601, a gateway 603, a gateway 604, or a supervisory control and data acquisition (SCADA) device 605, wherein the receiver 601, the gateway 603, the gateway 604, and the SCADA device 605 may communicate to each other via local area network (LAN) 602. The receiver 601, the gateway 603, the gateway 604, or the SCADA device 605 may support the same of different communication protocols such as bi-directional protocols or unidirectional protocols, wherein the bi-directional protocols may include TCP, and the unidirectional protocols may include UDP such as RTP, SNMP, RIP, or DNS lookup. For example, the receiver 601 may receive data packets of bi-directional or unidirectional protocol from the output terminal 220 of the one-way link circuit 200. If the data packets received by the receiver 601 is corresponded to unidirectional protocol, the receiver 601 may pass the received data packets to a target server. The gateway 603 (or gateway 604) may receive data packets of unidirectional protocol from the receiver 601 via the LAN 602, may convert the received data packets of unidirectional protocol to data packets of bi-directional protocol, and may store the data packets of bi-directional protocol. Therefore, if the SCADA device 605 supports only bi-directional protocol, the SCADA device 605 may retrieve data packets generated by the secure site 400 through the gateway 603 (or gateway 604).

In the embodiment, an unsecure site 700 may include a plurality of electronic devices such as a switch 701, a receiver 702, a gateway 703, a gateway 704, or a SCADA device 705. The receiver 702, the gateway 703, the gateway 704, or the SCADA device 705 may support the same of different communication protocols such as bi-directional protocols or unidirectional protocols, wherein the bi-directional protocols may include TCP, and the unidirectional protocols may include UDP such as RTP, SNMP, RIP, or DNS lookup. For example, the receiver 702 may be a UDP-based server such as a SNMP trap server. The receiver 702 may receive data packets generated by the electronic device group 403. The switch 701 may receive data packets of bi-directional or unidirectional protocol from the output terminal 320 of the one-way link circuit 300. The switch 701 may forward the data packets to a target device according to information (e.g., target address) captured from the data packets. The gateway 603 (or gateway 604) may receive data packets of unidirectional protocol form the switch 701, may convert the received data packets of unidirectional protocol to data packets of bi-directional protocol, and may store the data packets of bi-directional protocol. Therefore, if the SCADA device 705 supports only bi-directional protocol, the SCADA device 705 may retrieve data packets generated by the secure site 400 through the gateway 703 (or gateway 704).

If the electronic device group 401 is connected to the port P3 and the gateway 501 is connected to the port P2, the switch 100 may connect the electronic device group 401 and the gateway 501. The gateway 501 may emulate a SCADA device or a monitoring device to access data packets from the electronic device group 401 and may convert the data packets to the protocol adapted to one-way transmission (e.g., unidirectional protocol). The gateway 501 may forward the data packets generated by the electronic device group 401 to the unsecure site 600 via the port P6 and the one-way link circuit 200, or the gateway 501 may forward the data packets generated by the electronic device group 401 to the unsecure site 700 via the port P7 and the one-way link circuit 300.

If the electronic device group 402 is connected to the port P1 and the gateway 502 is connected to the port P1, the switch 100 may connect the electronic device group 402 and the gateway 502. The gateway 502 may emulate a SCADA device or a monitoring device to access data packets from the electronic device group 402 and may convert the data packets to the protocol adapted to one-way transmission. The gateway 502 may forward the data packets generated by the electronic device group 402 to the unsecure site 600 via the port P6 and the one-way link circuit 200, or the gateway 502 may forward the data packets generated by the electronic device group 402 to the unsecure site 700 via the port P7 and the one-way link circuit 300.

If the electronic device group 403 is connected to the port P5, the switch 100 may connect the electronic device group 403 and the port P6. The electronic device group 403 may transmit data packets to the one-way link circuit 200 via the port P5 and the port P6, wherein the data packets may support a protocol adapted to one-way transmission.

The switch 100 and electronic devices connected to the switch 100 may form multiple subnets isolated to each other. For example, the electronic device group 401 and the gateway 501 may form a first subnet by using the port P2 and the port P3 of the switch 100, and the electronic device group 402 and the gateway 502 may form a second subnet by using the port P1 and the port P4 of the switch 100. The first subnet may be isolated to the second subnet. Therefore, if an electronic device in the first subnet is infected by a computer virus, the computer virus will not be spread to the second subnet, and the security of the second subnet can be guaranteed.

Figure 3:
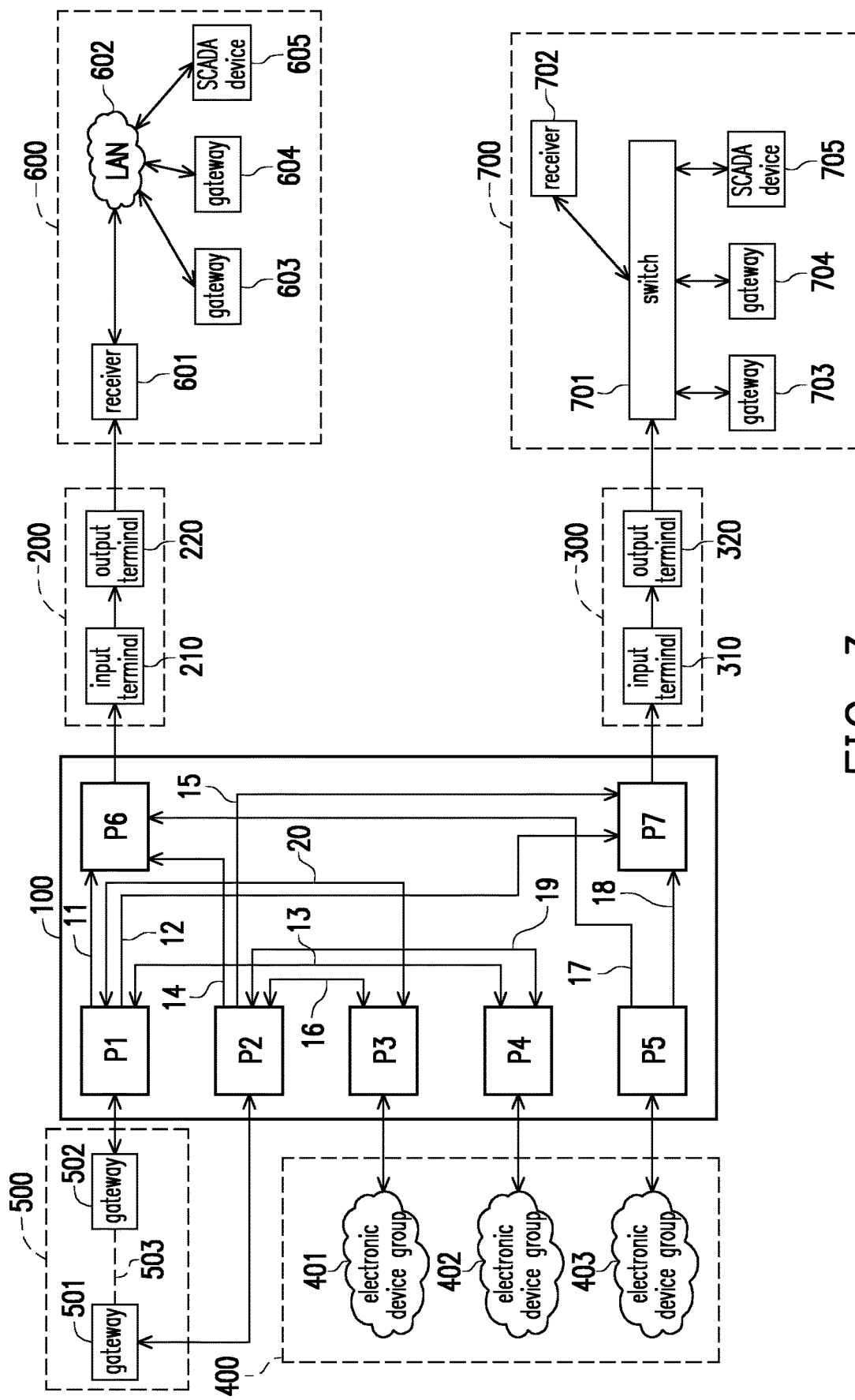
FIG. 3 illustrates connecting a secure site to an unsecure site by the switch device for the redundancy implementation according to an embodiment of the disclosure.

FIG. 3 illustrates connecting a secure site to an unsecure site by the switch device for the redundancy implementation according to an embodiment of the disclosure. In one embodiment, the port P1 may further be configured to connect to the port P3 through the path 20, and the port P2 may further be configured to connect to the port P4 through the path 19. Path 19 may be configured to allow the electronic device group 402 be able to connect to Gateway 501, and path 20 may be configured to allow the electronic device group 401 be able to connect to Gateway 502, too. The behavior is the same as in the embodiment of FIG. 2, but the data (e.g., data from the electronic device group 401 or 402) can be received by both Gateway 501 and 502. The gateway 502 may be a redundant gateway of the gateway 501. All the data packets received by the gateway 501 may be updated to the gateway 502 through a dedicated synchronization link 503. Normally, the gateway 501 may convert (as a protocol break) and forward data packets generated by the electronic device group 401 to the unsecure site 600 or unsecure site 700. Once the link between the gateway 501 and the port P2 or the gateway itself is failed, the gateway 502 may take over the gateway 501 immediately so as to convert (as a protocol break) and forward the data packet generated by the electronic device group 401 to the unsecure site 600 or unsecure site 700. The gateway 502 may check whether the gateway 501 is failed via the synchronization link 503. For example, the gateway 502 may determine that the gateway 501 is failed in response to not receiving a synchronization signal from the gateway 501 in a default time period.

In summary, the present disclosure may prevent devices in the secure site from receiving data transmitted by devices in the unsecure site by using a one-way link circuit. In addition, the present disclosure may create multiple subnets for devices in the secure site so as to prevent the devices from infecting each other. Therefore, the protection of the secure site can be guaranteed. On the other hand, the present disclosure may connect multiple computing devices (e.g., gateways or proxy servers) to the input terminal of the one-way link circuit. That is, transmission bottleneck of the one-way transmission will not be limited by the capability of the sending node which connects to the input terminal of the one-way link circuit.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A switch device for one-way transmission, comprising:
   a switch, comprising:
      a first port;
      a second port;
      a third port coupled to the second port via a first path and coupled to the first port via a second path;
      a fourth port; and
      a fifth port coupled to the fourth port via a third path and coupled to the first port via a fourth path; and
   a one-way link circuit, wherein an input terminal of the one-way link circuit is coupled to the first port.

2. The switch device according to claim 1, wherein the one-way link circuit is implemented by at least one of the followings:
   a diode circuit, a fiber, a RJ45 connector, and a field programmable gate array.

3. The switch device according to claim 1, wherein the switch further comprising:
   a sixth port coupled to the first port via a fifth path.

4. The switch device according to claim 1, wherein the switch further comprising:
   a sixth port coupled to the third port via a fifth path; and
   a second one-way link circuit, wherein a second input terminal of the second one-way link circuit is coupled to the sixth port.

5. The switch device according to claim 1, wherein the third port coupled to the fourth port via a fifth path.

6. The switch device according to claim 1, further comprising:
   an electronic device coupled to the second port; and
   a gateway coupled to the third port, wherein
   the electronic device transmits a first signal supported a first protocol to the gateway via the second port and the third port, wherein
   the gateway converts the first signal to a second signal supported a second protocol and outputs the second signal via the one-way link circuit.

7. The switch device according to claim 6, wherein the second protocol is a unidirectional protocol.

8. The switch device according to claim 3, further comprising:
   an electronic device coupled to the sixth port, wherein the electronic device outputs a signal supported a first protocol via the sixth port, the first port, and the one-way link circuit.

9. The switch device according to claim 8, wherein the first protocol is a unidirectional protocol.

10. The switch device according to claim 5, further comprising:
    a first electronic device coupled to the fourth port;
    a first gateway coupled to the fifth port; and
    a second gateway coupled to the third port and the first gateway, wherein
    the electronic device transmits a first signal supported a first protocol to the first gateway via the fourth port and the fifth port, and transmits the first signal to the second gateway via the fourth port and the third port, wherein
    in response to the first gateway not being failed, the first gateway converts the first signal to a second signal supported a second protocol and outputs the second signal via the one-way link circuit.

11. The switch device according to claim 10, wherein the second protocol is a unidirectional protocol.

12. The switch device according to claim 10, wherein
    in response to the first gateway being failed, the second gateway converts the first signal to a second signal supported a second protocol and outputs the second signal via the one-way link circuit.

* * * * *